Nov. 3, 1970   J. A. PLESNEVICH   3,537,117
CONVERTIBLE TRAILER-BOAT CONSTRUCTION
Filed Feb. 24, 1969   2 Sheets-Sheet 1
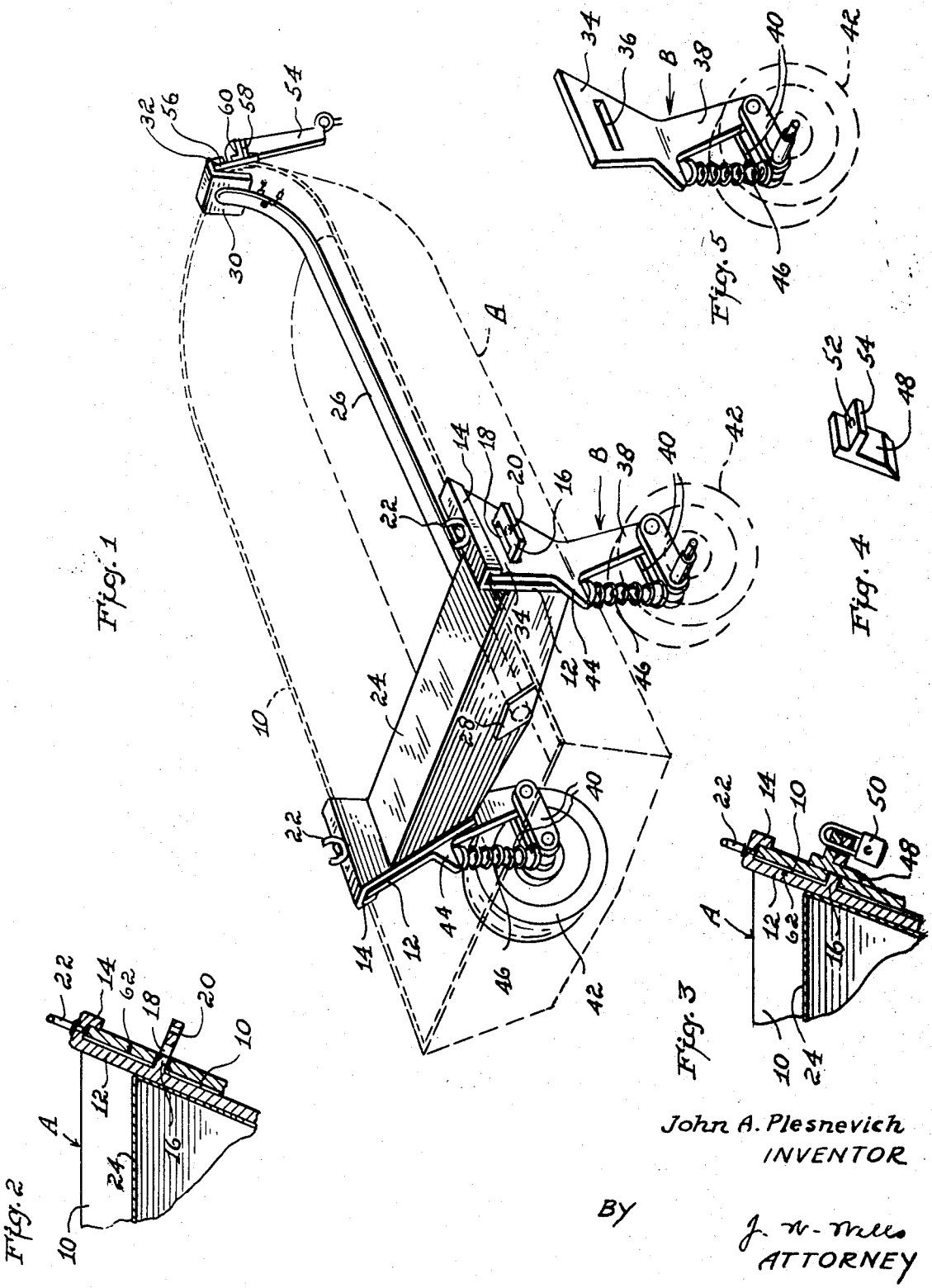
John A. Plesnevich
INVENTOR
BY   J. N. Mills
ATTORNEY

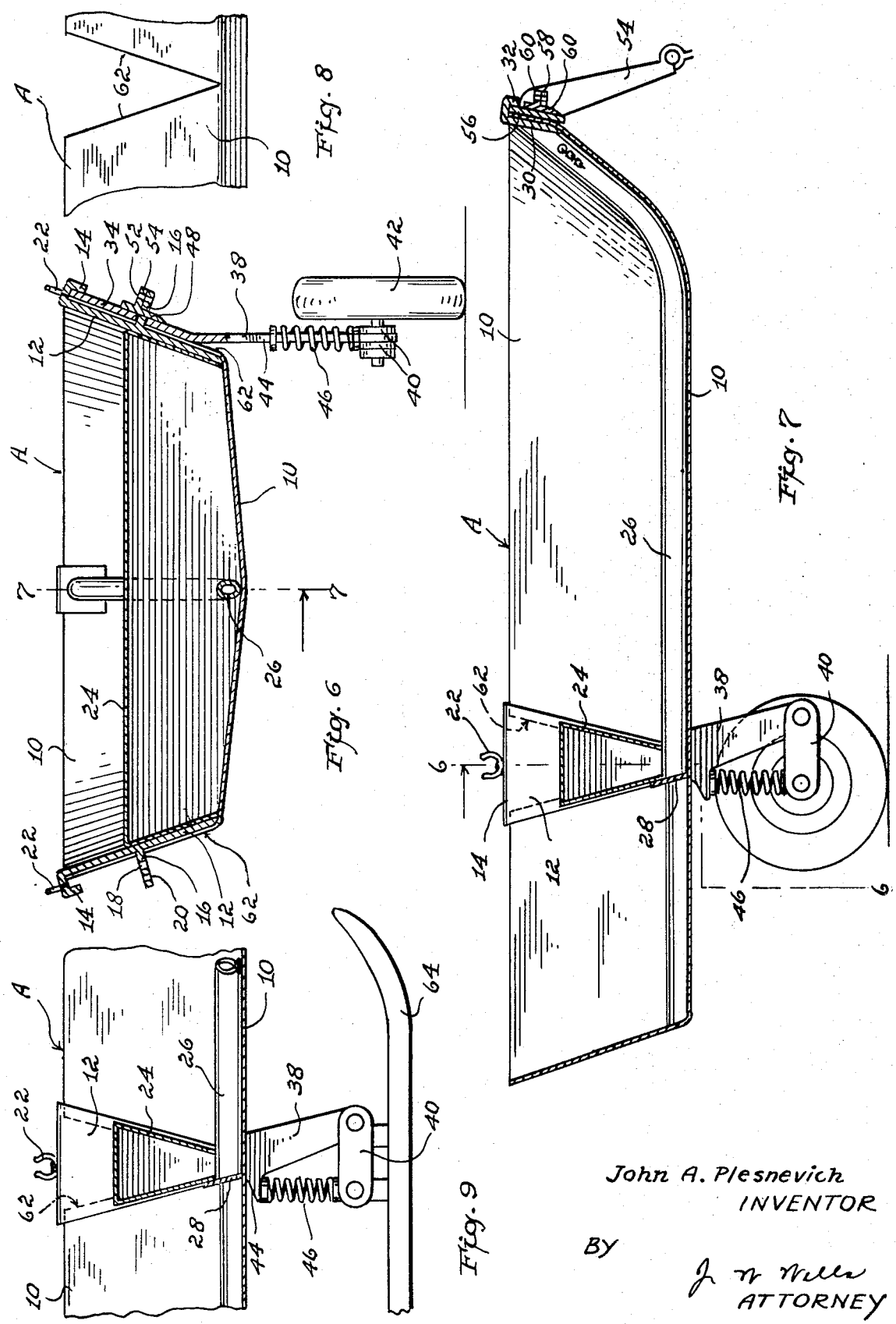

United States Patent Office 3,537,117
Patented Nov. 3, 1970

---

3,537,117
CONVERTIBLE TRAILER-BOAT CONSTRUCTION
John A. Plesnevich, Box 373, R.D. 1,
Allentown, N.J. 08501
Filed Feb. 24, 1969, Ser. No. 818,851
Int. Cl. B62d 53/00
U.S. Cl. 9—1     9 Claims

ABSTRACT OF THE DISCLOSURE

The combination of a sheet metal convertible boat with a pair of units carrying wheels, hydro-lift skis, pontoons or the like for supporting the boat while in transit across land, water or other horizontal surfaces, and a hitch member, each having cooperative structural means for facilitating the quick attachment of said units and hitch member to and detachment from said boat.

---

This invention relates to boats and also to wheeled trailers in that it involves a boat convertible by means of a pair of wheel carrier units attachable to and detachable from the boat, and also a hitch member for towing by an automobile or other vehicle. However, in the present invention the carrier units may also be provided with hydro-lift skis, pontoons or the like for supporting the boat while in transit across water, instead of wheels. In either conversion mentioned the structural means for the attachment of the carrier units to and the detachment from the boat may be the same.

One of the principal objects of the present invention is to provide a combination of a specially constructed boat of generally conventional design for small boats with a pair of specially designed wheel carrier units and a hitch member for towing purposes, each having cooperative structural means for effecting an easy and swift attachment of the units and hitch member to and detachment from the boat.

Another object of the invention is to provide a boat of the character mentioned fabricated of welded sheet aluminum or other suitable material with special reinforcing means to impart sufficient strength for supportinig substantial quantities of material within the boat when used as a trailer, so that sportsman's or camper's equipment, food and other supplies can be transported to a sea or lake site by means of a small automobile, and after unloading of the material from the boat the wheel units and the hitch member can be stored in the trunk of the automobile thus freeing the boat for use in the ordinary manner, and eliminating the necessity of parking a separate boat trailer.

If the convertible boat is to be used primarily for water sports after arrival at the sea or lake site, carrier units having hydro-lift skis, pontoons or other desired equipment can be transported to the site in the boat and then substituted for the wheel units.

A particularly advantageous feature of my combination boat and carrier units resides in the cooperative structural means on the boat shell and the carrier units whereby the carrier units can be quickly and positively placed in their correctly assembled position on the boat by merely inserting the upper edges of flat carrier members under depending flanges on the upper edges of the metal plates forming parts of the basic boat reinforcing framework with certain lateral projections on the metal plates inserted through longitudinal slots in the flat carrier members. This is true irrespective of whether the carrier units are provided with wheels, hydro-lift skis, pontoons or other boat supporting means.

Another distinctively advantageous feature resides in a sheet metal cross-piece of V or other suitable cross-sectional shape which not only reinforces the boat shell, but serves as a seat.

Other objects and advantages of my improved convertible boat and carrier units will be apparent or pointed out in the following specification in which reference is directed to the accompanying drawing forming a part thereof, and in which:

FIG. 1 is a perspective view of a boat combination in accordance with my invention, but with a clamping wedge in the assembly means detached therefrom, and with the boat shell shown in broken lines;

FIG. 2 is a detail section showing the manner of assembly of the carrier units with the boat shell;

FIG. 3 is a detail section similar to FIG. 2, but with a carrier unit in its final assembled position;

FIG. 4 is a perspective view of a clamping wedge member shown in FIG. 3;

FIG. 5 is a perspective view of a complete carrier unit provided with a trailer wheel;

FIG. 6 is a transverse sectional view of one embodiment of the boat and carrier units shown in FIG. 1 and taken on the line 6—6 of FIG. 7;

FIG. 7 is a longitudinal section taken on the line 7—7 of FIG. 6;

FIG. 8 is a detail side elevation of the boat shell; and

FIG. 9 is a fragmentary longitudinal section similar to FIG. 7, but showing a carrier unit provided with a ski, instead of a wheel.

Referring to the drawing in which like numerals designate like parts in the several views, the shell 10 of the boat A may be fabricated from welded sheel aluminum or other suitable thin and light material of ordinary conventional design with the exception of certain features especially designed for reinforcing the boat shell 10 and also for the easy and swift attachment of pairs of carrier units to the boat A and detachment therefrom.

The basic frame structure for reinforcing the boat shell 10 includes a pair of transversely opposed and outwardly flaring plates 12 of V or other suitable front elevational shape and terminating at their upper edges in outwardly projecting depending flanges 14 each having below said flange a flat rectangular projection 16 extending laterally therefrom and provided with a vertical longitudinal slot 18 and a vertical opening 20. Oar locks 22 may be rotatably attached to the upper portions of the flanges 14. A sheet metal cross-piece member 24 of rectangular plan formation and of a cross-sectional shape preferably corresponding to the face contours of plates 12 is welded at its ends to said plates. An aluminum tube 26 is welded to a plate 28 attached to the lower rear surface of the cross-piece 24 and extends longitudinally and centrally to the front end of the boat where it is welded to another plate 30, the upper edge of which terminates in an outwardly projecting flange 32. This tube may be spot welded or continuously welded to the bottom of the boat shell 10.

Each of a pair of carrier units B comprises an upwardly extending flat portion 34 preferably corresponding in face contour with that of the metal plates 12 and having a horizontal slot 36 a short distance below its upper edge in a plane to permit the insertion therethrough of the flat projection 16 when the flat portion 34 of a carrier unit B is inserted underneath a flange 14 of a plate 12. The portion 34 of the carrier unit B merges into a depending arm portion 38 to which is connected a pair of links 40 on the free ends of which, in the embodiment of the invention shown in FIGS. 1 to 8, is journaled a trailer wheel 42. Between the upper edges of the links 40 and a projection 44 on the carrier unit B is a compression spring 46 for cushioning the wheel in transit. As previously mentioned, the carrier unit B can be quickly attached to the boat by merely inserting the upper flat portion 34 under the flange 14 with the lateral projection 16 inserted through the longitudinal slot 36 and inserting a clamping wedge member 48 through the vertical slot 18. A padlock 50 may then be attached through the vertical opening 20 in the projection 16 and a registering vertical opening 52 in a lateral projection 54 of the wedge member 48.

The hitch member 54 has a flange portion 56 provided with a lateral projection 58 having a vertical slot (not shown) through which the wedge member 60 is inserted in the same manner as the wedge member 48.

As shown more clearly in FIGS. 6, 8 and 9 the opposite sides of the boat shell 10 are cut into V-shaped slots 62 the edges of which overlap the outer marginal surfaces of plates 12 where they are welded or otherwise rigidly attached to those plates.

As also previously mentioned, hydro-skis 64, pontoons or the like may be attached to the depending arms 38 of the carrier units B, instead of wheels as shown in FIG. 9, so that after the wheel units are removed from the boat it may be used for water sports in the ordinary manner of a motor boat. Obviously, the rear wall of the boat may be reinforced in any suitable manner for supporting an outboard motor.

From the foregoing description it will be seen that my convertible trailer-boat construction is not only economical in fabrication but is easily and quickly adaptable as a trailer provided with wheels for road travel and thereafter used as an ordinary boat or as a motor boat provided with hydro-skis, pontoons or the like for water sports by simply substituting carrier units with different means of supporting the boat in transit across land, water or other horizontal surfaces.

Although the boat shell 10 is made of thin, light material, the basic frame structure around which the shell is fabricated, as described, provides such a boat with adequate strength for the purposes referred to.

Obviously, various detail changes or modifications in my improved convertible boat construction may be made within the spirit and scope of my invention. Therefore, it should be understood that the embodiments of my invention shown and described are intended to be illustrative only, and restricted only by the appended claims.

I claim:

1. In combination, a convertible trailer-boat construction including a basic frame structure comprising a pair of transversely spaced plates disposed in upwardly flaring relation, a thin walled cross-piece member having a horizontal rectangular top surface with depending side portions rigidly attached at its ends to the inner surfaces of said plates, a tubular member rigidly attached at its rearward end to the rear side portion of said cross-piece member in forwardly extending right-angular relation therewith, and having its forward end turned upwardly in conformity with the front wall of the boat, a pair of carrier members carrying contact elements for supporting the boat while in transit across horizontal surfaces, said carrier members having upwardly extending flat portions provided with means cooperative with means on the outer surfaces of said plates for rigidly, but removably, attaching said carrier members to said plates; and a boat shell of thin sheet material enclosing said basic frame structure, said shell being rigidly attached to the front end and bottom of said tubular member, to the bottom edges of said cross-piece member and to the marginal edge surfaces of said upwardly flaring plates.

2. A convertible trailer-boat construction as in claim 1 in which the side walls of the boat shell are cut away to form openings to fit against the outer surfaces of said plates, the marginal edge portions of said openings being rigidly attached to the marginal edge portions of said plates.

3. A convertible trailer-boat construction as in claim 1 and including a plate rigidly attached to the front end of the boat shell to which the front end of the tubular member is rigidly attached, a hitch member and means on said hitch member cooperative with means on said plates for rigidly, but removably, attaching said hitch member to said plate.

4. A convertible trailer-boat construction as in claim 1 in which the upwardly flaring plates, the cross-piece member attached thereto, the tubular member and the boat shell are all made of aluminum.

5. A convertible trailer-boat construction as in claim 1 in which said contact elements on the carrier members are wheels for supporting the boat while in transit across land surfaces.

6. A convertible trailer-boat construction as in claim 1 in which said contact elements on the carrier members are of ski-like design for supporting said boat while in transit across water surfaces.

7. A convertible trailer boat construction as in claim 1 in which the cooperative means on the outer surfaces of said upwardly flaring plates and the upwardly extending flat portions of said carrier members for attaching said carrier members to said plates comprise a horizontal slot in the upwardly extending flat portions of each of the carrier members, an outwardly projecting depending flange on the upper edge of each of said plates and a flat rectangular projection below said flange for insertion through the slot in its associated carrier member, said projection having therein a vertical longitudinal slot and a wedge member insertable through said slot for clamping said carrier member to said plate.

8. A convertible trailer-boat construction as in claim 7 in which each of said wedge members has a lateral projection in overlapping relation with the lateral projection on its associated carrier member, said lateral projections having a registering vertical openings through which the yoke of a padlock is inserted for locking said wedge member and carrier member to its associated upwardly flaring plate.

9. A convertible trailer-boat construction as in claim 1 in which the contact elements are mounted on the outer ends of link members pivotally attached to the lower ends of depending arms on said carrier members and including vertical compression springs interposed between the outer ends of said link members and projections on said carrier members.

References Cited
UNITED STATES PATENTS

| | | | |
|---|---|---|---|
| 2,909,378 | 10/1959 | Borchers | 280—79.1 |
| 3,068,024 | 12/1962 | Berliner | 280—414 |
| 3,226,738 | 1/1966 | Fox | 9—1 |
| 3,281,874 | 11/1966 | Sholl | 9—1 |
| 3,416,813 | 12/1968 | Sholl | 9—1 |

LEO FRIAGLIA, Primary Examiner

U.S. Cl. X.R.

280—8, 414